United States Patent [19]

Lind

[11] Patent Number: 4,864,586
[45] Date of Patent: Sep. 5, 1989

[54] HOLLOW CATHODE GLOW DISCHARGE RING LASER BLOCK AND ELECTRODE STRUCTURE FOR RING LASER ANGULAR RATE SENSORS

[75] Inventor: Bruce J. Lind, Anoka, Minn.

[73] Assignee: Honeywell Inc., Minneapolis, Minn.

[21] Appl. No.: 133,764

[22] Filed: Dec. 14, 1987

[51] Int. Cl.$^4$ .............................................. H01S 3/083
[52] U.S. Cl. ....................................... 372/94; 372/83; 372/85; 372/88; 356/350
[58] Field of Search ..................... 372/94, 88, 83, 85, 372/87; 356/350

[56] References Cited

U.S. PATENT DOCUMENTS

| | | | |
|---|---|---|---|
| 3,390,606 | 7/1968 | Podgorski | 88/14 |
| 3,396,301 | 8/1968 | Kobayashi et al. | 372/88 |
| 3,868,593 | 2/1975 | Fukuda et al. | 331/94.5 D |
| 4,007,431 | 2/1977 | Abbink et al. | 331/94.5 PE |
| 4,158,821 | 6/1979 | Bresman | 331/94.5 D |
| 4,257,014 | 3/1981 | Hattori et al. | 331/94.5 PE |
| 4,420,835 | 12/1983 | Hattori et al. | 372/88 |

OTHER PUBLICATIONS

"Helium singlet and triplet metastable number densities in hollow-cathode/metal-vapour lasers", J. Phys. D: Appl. Phys., vol. 11, 1978, IA McIntosh et al.
"Hollow-Cathode Glow Discharge in Hydrogen and the Nobel Gases", Journal of Applied Physics, vol. 37, No. 6, 2405–2412, May 1986, D.J. Sturges and H.J. Oskam.
"Hollow-Cathode Transverse Discharge He-Ne ad He-Cd+ Lasers", Applied Physics 2, 143–150, 1973, by S.C. Wang and A.E. Siegman.
"A Qualitative Theory of the Medium Pressure Hollow Cathode Effect", Physica 37, 457–466, by D.J. Sturges and H.J. Oskam.
"Studies of the Properties of the Hollow Cathode Glow Discharge in Helium and Neon", by D.J. Sturges and H.J. Oskam, Journal of Applied Physics, vol. 35, No. 10, 2887–2894, 1964.

Primary Examiner—William L. Sikes
Assistant Examiner—Xuan Thi Vo
Attorney, Agent, or Firm—Robert A. Pajak

[57] ABSTRACT

The present invention provides a ring laser gyro which utilizes a gas impervious block containing at least three tunnels which meet to form a closed-loop, gas containing, cavity, and allow passage of laser beams therethrough. A pair of electrodes are positioned in alignment with one of the tunnels, and positioned relative to each other to support a current through the gas and establish a glow discharge region within a portion of one of the tunnels to induce a pair of counter-propogating laser beams to propogate through the established glow discharge region in a direction transverse to the direction of the discharge current.

5 Claims, 2 Drawing Sheets

HOLLOW CATHODE GLOW DISCHARGE RING LASER BLOCK AND ELECTRODE STRUCTURE FOR RING LASER ANGULAR RATE SENSORS

BACKGROUND OF THE INVENTION

This invention relates to a novel construction for a ring laser angular rate sensor and more particularly to the anode-cathode electrodes for generating the laser beams of the sensor.

After years of development, ring laser angular rate sensors, commonly referred to as ring laser gyros, have become commercially successful products and are rapidly replacing conventional mechanical angular rate sensors in many applications. Most commercial ring laser angular rate sensors use a mechanically and thermally stable block construction and mechanical dither concepts taught in U.S. Pat. No. 3,390,606, issued to Podgorski, U.S. Pat. Nos. 3,467,472 and 3,373,650, issued to Killpatrick, which are all assigned to the assignee of the present invention. The above-referred to patents are incorporated herein by reference thereto.

Ring laser angular rate sensors, of the type referred to, commonly utilize a block of material that is dimensionally stable, both thermally and mechanically. The block usually includes a plurality of interconnected gas-containing tunnels or passages which form a closed-loop path in the shape of a triangle, a rectangle, or any polygonal path. At each intersection of a pair of interconnecting tunnels is a reflective surface provided by a mirror mounted on the block. This arrangement of mirrors and interconnected tunnels form an optical closed-loop path. Further, at least one anode and one cathode are each mounted on the block in communication with the gas. Each of the components, including the mirrors, anode, and cathode must be sealed to the block to form a gas tight seal. The block is usually filled with a lasing gas such as a mixture of helium and neon. If a sufficiently large electric potential is applied between the anode and cathode, a discharge current will flow therebetween and will result in a production of a pair of counter-propagating laser beams within the block.

Ring laser angular rate sensors, and specifically ring lasers, known in the art, utilize a anode-cathode combination which is in communication with the gas containing closed loop cavity. A sufficiently large direct current electric potential is applied between the anode and cathode to generate a direct electrical current between the anode and cathode through the gas. The electrical current through the gas creates distinct gas discharge regions of ionized gas atoms which are dependent on the cathode-anode configuration. In ring lasers of the prior art there usually exists (i) a cathode fall discharge region nearest the cathode surface, (ii) a negative glow discharge region in the hollow cathode, (iii) a positive column discharge in portions of the hollow cathode cavity, portions of the closed-loop optical cavity defined by the tunnels, and in proximity of the anode, and (iv).an anode fall discharge region in close proximity to the anode surface.

As is well understood by those skilled in the art, the positive column discharge will contain a population of excited gas atoms (population inversion) which will emit photons and begin the process of creating counter-propagating laser beams along the optical closed-loop path. The laser beams, once established, continually pass through the positive column discharge and generally collinear with the direction of current flow of the gas discharge current within the positive column.

The positive column discharge in the closed-loop cavity of a ring laser gives rise to gas circulation within the optical closed-loop cavity. Particularly, the positive column discharge in ring laser angular rate sensors of the prior art gives rise to gas circulation collinear with the counter-propagating laser beams of the ring laser and collinear with the discharge current direction within the positive column. This is thought to be attributed to momentum exchange between charged particles and the walls and charged particles and neutral particles, sometimes referred to as the Langmuir gas flow. In positive column discharge ring laser angular rate sensors of the prior art, this momentum exchange gives rise to moving gain atoms in the gas collinear with the laser beams. This results in large bias effects in the performance of the ring laser angular rate sensor. This bias appears as a difference in path length in the absence of rotation. This results in a false or biased sensor readout signal which results in an erroneous rotation rate indication or bias. Further, the positive column discharge ring laser angular rate sensors also gives rise to temperature gradients within the laser block which also impacts the bias and bias stability of the sensor.

In order to minimize the effects on the performance of the ring laser angular rate sensor due to positive column discharge operation, a symmetrical split DC discharge circuit has been utilized to provide "bias-balancing" and improve bias stability. This technique comprises, commonly, either a single cathode and a pair of anodes, or a single anode and a pair of cathodes symmetrically placed along the optical path length traversed by the laser beams. Two positive column discharges are created. The two discharges have opposite polarity as seen by the counter-propagating laser beams. In triangular ring lasers known in the art, the positive column created by the anode-cathode combination selected, results in a positive column in one direction, passing one of the laser mirrors, and results in a second positive column in the opposite direction, passing another of the laser mirrors. This unfortunately exposes the mirrors to the ionized gas in the form of the positive column discharge which can degrade the mirror performance.

A DC positive column discharge technique for ring lasers, specifically for ring laser angular rate sensors, have other disadvantages including, among others, stability of the gas discharge since a positive column exhibits a negative impedance which increases the tendency of the discharge to oscillate.

OBJECTS OF THE INVENTION

It is an object of the invention to provide a gas discharge technique for a ring laser which diminishes ga flow collinear with the counter-propagating laser beams associated with a positive column discharge to improve the performance of the ring laser sensor. It is another object of the invention to provide a hollow cathode-anode gas discharge arrangement which enhances start-up and allows lower operating voltages. It is another object of the invention to provide a gas discharge technique for ring laser angular rate sensors which minimizes exposure of the mirrors to plasma. It is another object of the invention to provide improved stability by eliminating the use of a positive column discharge in the tunnels forming the optical closed-loop path of a ring laser thereby obtaining a positive impedance discharge.

BRIEF DESCRIPTION OF THE INVENTION

The present invention provides a ring laser which utilizes a gas impervious block containing at least three tunnels which meet to form a closed-loop, gas containing, cavity and allow passage of laser beams therethrough. A pair of electrodes are positioned in alignment with one of the tunnels, and positioned relative to each other to support a current through the gas and establish a glow discharge region within a portion of one of the tunnels to induce a pair of counter-propagating laser beams to propagate through the established glow discharge region in a direction transverse to the direction of the discharge current and thereby establish a pair of counter-propagating laser beams. In the present invention, the laser block is slotted to receive a mated anode-cathode pair of electrodes in which the cathode is slotted to receive a tongue shaped member of the anode.

DETAILED DESCRIPTION OF THE INVENTION

Figure 1:
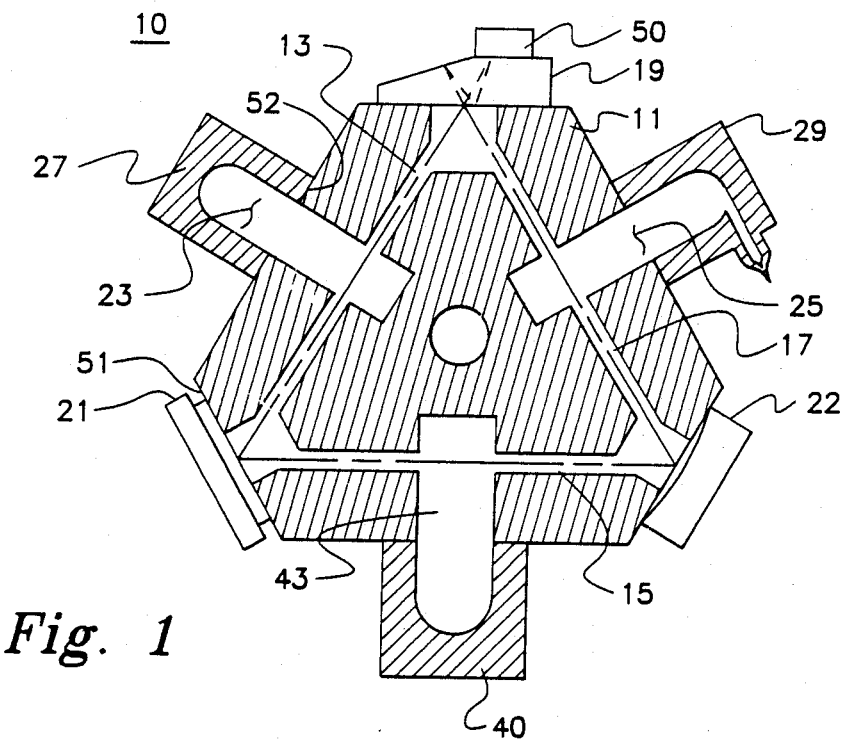
FIG. 1 is a plan view of a ring laser angular rate sensor which utilizes the split DC discharge current path for creating a positive column discharge.

Referring now to FIG. 1, there is disclosed a pictorial representation of a gas-filled ring laser angular rate sensor 10 constructed in a manner known in the prior art. Sensor 10 comprises a block 11 made of a quartz-like material such as Cervit, Zerodur, or the like or glasses such as BK-7, (letter number combinations are Schott optical commercial designations). A plurality of three interconnected tunnels 13, 15, and 17 are bored within block 11 at angles to each other to form a triangular-shaped cavity. Mirror assemblies 19, 21, and 22 are bonded to end surfaces of block 11 which form the intersection of each of the tunnels 13, 15, and 17, respectively. Each mirror functions to reflect light from one tunnel into the next thereby forming a closed-loop optical path. A pair of anodes 27 and 29 are bonded to end surfaces of laser block 11 and adapted to communicate with laser tunnels 13 and 17, respectively, through interconnecting cavities 23, and 25, respectively. A quantity of lasing gas is adapted to be contained within the tunnels 13, 15, and 17, and other tunnels in communication therewith. A gas may be inserted into the block cavities through one of the anode cavities, e.g. 25, used as a fill-tube and sealable port, e.g. anode 29.

A cathode 40 is boded to an end surface of laser block 11 and in communication with the optical closed-loop cavity through interconnecting cavity 43. Cathode 40 is symmetrically located relative to anodes 27 and 29, and tunnels 13, 15, and 17. These symmetrical locations of the pair of anodes and the single cathode is intended to reduce the gas flow effects, discussed above, which can adversely effect the performance of the rate sensor, as is well known.

In operation with a sufficiently large potential applied between the cathode and the anodes, a first discharge current flows from cathode 40 out into cavity 15 toward mirror 21 and through tube 13 to anode 27. A positive column discharge is created along the current discharge path except in close proximity to regions near anode 27 and cathode 40. In these close proximity regions, there exists the anode fall discharge region, cathode fall discharge region and negative glow discharge region, as is well known. Similarly, a second discharge current flows through cathode 40 out into tube 15 toward irror 22 and through tube 17 to anode 29. Like the first discharge current, a positive column discharge is created along the path of the second discharge path. These two discharge currents are usually controlled in intensity, and more specifically, the currents are usually intended to be equal. The discharge current's function is to ionize the lasing gas and provide a positive column discharge. This creates the population inversion of atoms which results in emitted photons. The emission of the photons, in turn, then creates a pair of counter-propagating laser beams within the closed-loop optical cavity in a well known manner. It will be appreciated by those skilled in the art that ring laser angular rate sensors with a rectangular lasing path or other optical cavity configurations, including a cubic cavity, are constructed in a similar manner as just described.

Each of the aforementioned mirrors perform functions in addition to redirecting the laser beams about the cavity. Mirror 19 may be constructed so as to be partially transmissive for providing a readout beam signal to be directed toward a photo sensitive means 50. Mirror 22 is preferably curved so as to aid in the alignment and focusing of the counter-propagating laser beams within the cavity. Lastly, mirror 21 may be, in part, a transducer for cavity path length control in a well known manner. A suitable readout device 50 is disclosed in U.S. Pat. No. 4,152,072, issued to Hutchings and is incorporated herein by reference thereto. The construction of the ring laser angular rate sensor described above and its performance are in accordance with the basic operating principles of prior art ring laser angular rate sensors.

Figure 2:
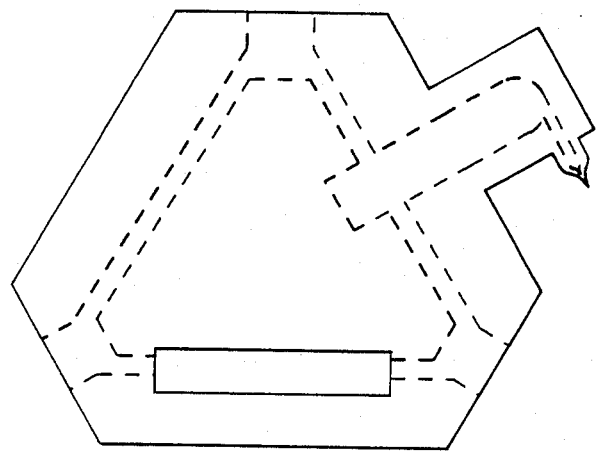
FIG. 2 is a top view of a ring laser angular rate sensor block in accordance with the present invention.
Figure 3:
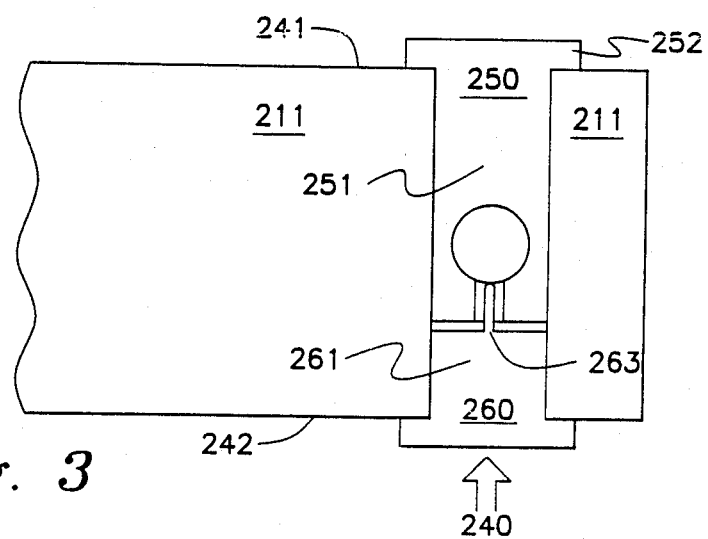
FIG. 3 is a cross-sectional view along detail lines 3—3 of the ring laser of FIG. 2 showing the anode-cathode structure of the present invention.
Figure 4A:
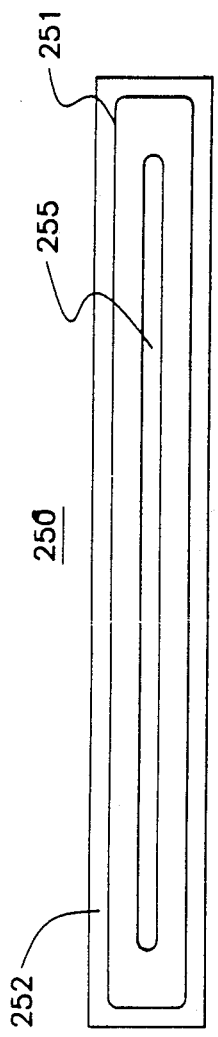
FIGS. 4A–C are views of one embodiment of a cathode configuration in accordance with the present invention.
Figure 4B:
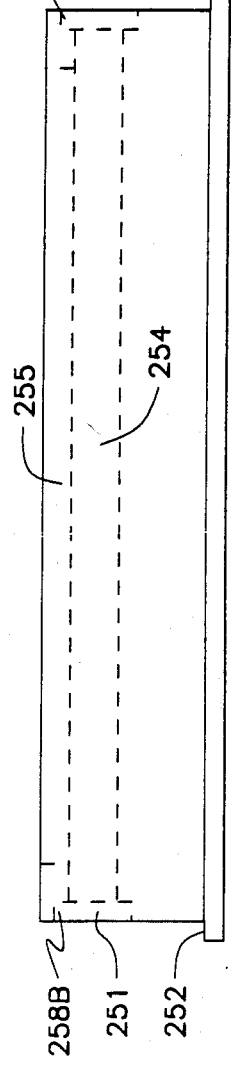
Figure 4C:
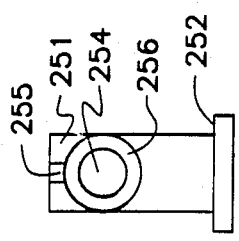

Shown in FIGS. 2–4 is a ring laser angular rate sensor having a hollow cathode - anode configuration constructed in accordance with the present invention. Shown in FIG. 2, is a ring laser block 211 having tunnels 213, 215 and 217 similarly arranged as tunnels 13, 15 and 17 of FIG. 1. Anode 27, cathode 40, and passages 23 and 43 shown in FIG. 1 have been eliminated and replaced by the anode-cathode configuration as will be described with reference to FIG. 2 and subsequent drawings. Combination anode and fill tube 29 is still shown in FIG. 2, but only serves as a gas fill tube in the present invention. Further, the drawing in FIG. 2 has been shown without the mirror structures in order to simplify the drawing and enhance understanding of the present invention.

Referring now to FIGS. 2 and 3, block 211 is machined or milled through block 211 and including opposite surfaces 241 and 242 to create a slot 240 to receive dimensionally mating electrodes 250 and 260, respectively, as illustrated in the cross-sectional view of FIG.

3. Electrode 250 is further detailed in FIGS. 4A-C and electrode 260 is further detailed in FIGS. 5A-C.

Electrode 250 includes a longitudinal member 251 extending from flange 252. Through the longitudinal member 251, in the longitudinal direction, is a circular aperture 254. Further, there is a slot 255 cut through a portion of surface 256 of longitudinal member 251. Slot 255 extends through the longitudinal member 251 and is in communication with aperture 254 in a longitudinal direction of member 251. Each of the ends of the aperture 254 include a recess circular aperture identified as apertures 258a and 258b for receiving end caps as will be subsequently described. In the preferred embodiment, slot 255 is shown to be in alignment with the axis of the circular aperture, but in length less than the full length of the longitudinal member 251.

Figure 5A:
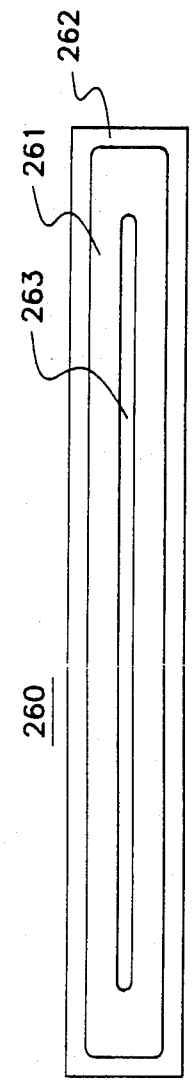
FIGS. 5A–C are views of one embodiment of an anode configuration in accordance with the present invention.
Figure 5B:
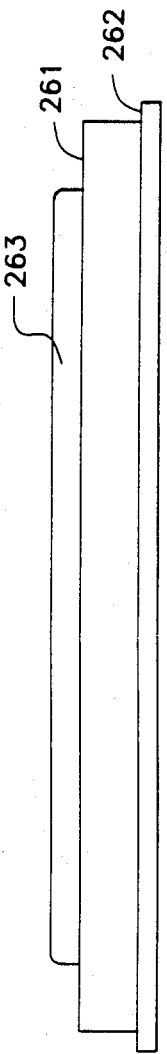
Figure 5C:
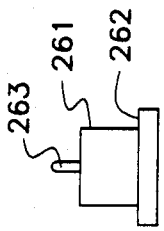

FIG. 5A-C illustrates electrode 260. Electrode 260 includes a longitudinal member 261 with a protruding longitudinal or tongue member. Protruding member 263 is intended to be positioned in slot 255 as illustrated in FIG. 3 and as will be subsequently described.

Electrode 250 is intended to be dropped into slot 240 and rigidly secured to surface 241 of block 211 by means of flange 252. Flange 252 is secured to block surface 241 to form a gas tight seal by any of a variety of techniques, e.g. an indium seal. Further, longitudinal member 251 is dimensionally constructed such that aperture 254 is in axial alignment with tunnel 215 and permits laser beams to propagate therethrough and along the usual ring laser beam path.

In a similar manner, electrode 260 is dropped into slot 240 and rigidly secured to surface 242 of block 211 by means of flange 262. Flange 262 is secured to block surface 242 to also form a gas tight seal. Further, longitudinal members 261 and 263 are dimensionally constructed such that tongue member 263 extends into at least a portion of slot 255 of electrode member 251. Preferably, tongue member extend entirely through slot 255 and stops at the tangential edge of aperture 254 to provide the desired hollow cathode effect. Electrodes 250 and 260 are intended to be mating parts such that longitudinal member 263 of electrode 260 can pass without contact through slot 255 so as to be in close proximity with aperture 254. When electrode 250 is electrically connected to a negative supply voltage, and electrode 260 is electrically connected to a positive supply voltage relative to said negative supply voltage, electrode 250 serves as a cathode and electrode 260 serves as an anode.

The combination of electrodes 250 and 260 provide a hollow cathode configuration. Exemplary dimensions of the diameter of aperture 254 may be in the order of 0.25 inches, the slot being in the order of 0.1 inches and the protruding member 263 to be in the order 0.05 inches. The length of the longitudinal members of electrodes 250 and 260 are a matter of design choice, but are preferably as long as possible in one of the legs of the laser path. Of course, the dimensions are dependent upon the materials chosen and the size of the lasing path and block.

The dimensions of the protruding member 263 and slot 255, as well as aperture 254 are selected to minimize shorting of cathode 250 to anode 260 which could cause a short between cathode 250 and anode 260 due to sputtering during laser life.

Figure 6:
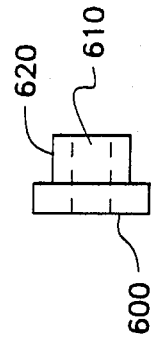
FIG. 6 is a plan view of end cap for the cathode.

In order minimize the shorting effect, at both ends of the apertures 254 are identical end caps as illustrated in FIG. 6. End caps 600 are inserted into the recess ends 258a, 258b of aperture 254. End cap 600 includes a centrally located protruding member 620 having a diameter less than the diameter of aperture 254. Further, end caps 600 include an aperture 610 therethrough so as to be in axial alignment with aperture 254 and tunnel 215 to permit the passage of the laser beams therethrough.

The end caps are utilized to control sputtering of the cathode to other surfaces extending beyond the cathode, particularly long tunnel 215. These end caps are intended to strictly define a cathode area and current path. Additionally, edges of slot 255 and edges of longitudinal member 263 of electrode 260 may be rounded to produce a more uniform field emission as well as minimize any electrode sputtering.

In operation, an electrical supply voltage has its negative side connected to electrode 250 and its positive side thereof electrically connected to electrode 260 to form the anode. The cathode-anode configuration, as illustrated, creates a hollow cathode effect discharge having a negative glow discharge region substantially along the length of the cathode and in the aperture 254. The discharge, i.e., the discharge current created in practice of the present invention results in a gas flow which is essentially transverse to the path of the laser beams. Operation of the ring laser in this manner avoids the problems associated with positive column gas flow effects in which the discharge current direction is collinear with the laser beams of the prior art ring laser angular rate sensors. The physical properties of the hollow cathode in accordance with the present invention are particularly described in three publications by D. J. Sturges and H. J. Oskam, J. Applied Physics, No. 35 (1964), J. Applied Physics, No. 37 (1966), and Physica, No. 37 (1967).

The hollow cathode of the present invention is intended to be operated under conditions to produce the hollow cathode effect as particularly described in the Applied Physics paper No. 35. Specifically, paper No. 35, states "..above a critical gas pressure that depends on the type of gas and on the discharge current, the discharge will take place almost entirely from the interior of the cavity. A transition is accompanied by a marked increase in the discharge current for a given voltage across the discharge tube. The phenomenon is known as the hollow cathode effect." Further, Applied Physics paper No. 37 shows the hollow cathode effect as a function of gas discharge pressure and the geometry of the cathode configuration. Particularly, it shows that the discharge voltage (discharge current) is related to the gas pressure multiplied by the plate separation of a pair of planar cathodes.

In the present invention, the hollow cathode effect is also related to the gas pressure of the discharge device and the geometric configuration of the aperture 254 of electrode 250. Therefore, practice of the present invention requires the proper selection of gas pressure and geometric configuration of cathode apertum 254 to achieve the hollow cathode effect in the chosen hollow cathode configuration. Of course, in the present invention, cathode apertum 254 is cylindrically shaped and therefore is dependent upon diameter. A proper selection of gas pressure and cathode geometry produces a spacially stable glow discharge region and a stable discharge current, the stability of which provides for better performance in ring laser inertial angular rate sensors.

The present invention has been described with reference to a preferred embodiment, and should be understood by those skilled in the art that various changes may be made and equivalents may be substituted for elements thereof without departing from the true spirit and scope of the present invention. In addition, many modifications may be made to the teaching of the present invention to adapt to a particular situation or material without departing from the essential teachings.

The details of the embodiment of the invention just described in FIGS. 2–6 are only exemplary in nature. Particularly, the apertures illustrated in the drawings have been shown generally as circular apertures. It is, of course, within the scope of the present invention that such apertures may be of a different configuration. Although one form of end cap has been illustrated, other techniques for end caps may also utilized. For example, a simple disk having a recessed circular aperture and an aperture passing through the disk can be provided on both ends of cathode apertum 254 to provide the intended function, that is to minimize the possibility of shorting the anode to the cathode by way of sputtering during the life of the cathode.

Generally, electrodes 250 and 260 may be totally made of an electrically conductive material such as invar, or any other electrically conductive material. On the other hand, each of the electrodes 250 and 260 may be made of a combination of an insulating material having portions thereof having a coating of electrically conductive material to again provide the intended function of anode-cathode in close proximity to create the negative glow discharge region along the length of the tunnel 215.

Finally, the design of the hollow cathode-anode configuration in accordance with the present invention is one which allows the creation of a glow discharge region and permits the initiation and propagation of laser beams through the glow discharge region in a direction transverse to the direction of the discharge current. Further, the glow region generated may be the negative glow region, the Faraday dark space or the like.

It should be recognized by those skilled in the art that although the anode and cathode are shown to be joined at opposite surfaces of block 211, is within the scope of the present invention that one or the other of the electrodes may be at a surface perpendicular to one of the joining surfaces. That is, the slot 255 may be actually constructed at an angle of 90 degrees relative to that shown in FIG. 4C. In this manner, electrode 260 may be provided by an additional slot passing through the side of block 211 at an angle of 90 degrees relative to surface 241. In such a situation, one can visualize FIG. 3 having electrode 260 coming from the right side surface of block 211 so that the protruding longitudinal member 263 will enter slot 255 at a right angle to that as illustrated in the drawings.

Although the drawings illustrate an electrode configuration having mounting flanges, the slot and electrode can have other geometrical shapes to provide surfaces for fixing the electrodes to the block and at the same time provide a gas tight seal. For example, the electrodes could be wedge-shaped and the slot could be milled to match the wedge-shaped electrode. Further, the block itself may also provide one of the electrodes, and one of the slots in the block need only pass through a portion of the block to accept a mating second electrode.

I claim:

1. A ring laser comprising:

a gas impervious block containing at least three tunnels meeting to form, at least in part, a closed-loop gas containing cavity, said block further including,
a first aperture extending into said block between a first block surface and a least a portion of said first one of said tunnels, said aperture being slot-shaped and extending longitudinally in parallel with said first tunnel and in communication therewith, and
a second aperture extending into said block through a second block surface and in communication with said first aperture, said second aperture being slot-shaped and extending longitudinally in parallel with said first aperture;
electromagnetic wave reflecting surfaces, forming, in part, said cavity, for reflecting a pair of counter-propagating electormagnetic waves to propagate along said closed-loop cavity substantially defined by said tunnels;
a gas contained within said closed-loop cavity;
a first electrode including a first mounting member and a first longitudinal member, said first longitudinal member having a third aperture therethrough in parallel with said first longitudinal member, said first longitudinal member including a slot extending through at least a portion of a first surface of said first longitudinal member and in communication with said third aperture, said first longitudinal member being positioned in said first block aperture such that said third aperture is in axial alignment with said first tunnel such that the central axis of said first one of said tunnels passes through said third apertures, said third aperture including electrically conductive surface portions adapted to be electrically connected to a negative supply voltage;
a second electrode including a second mounting member and a second longitudinal member, said second longitudinal member being positioned in said second block apertures such that said second longitudinal member is in alignment with said slot in said first longitudinal member, said second longitudinal member being shaped to include an electrically conductive portion extending through at least a portion of said slot in said first longitudinal member and in close proximity with said third aperture, said electrically conductive portion of said second longitudinal member adapted to be electrically connected to a positive supply voltage relative to said negative supply voltage;
said first and second mounting members rigidly fixed and sealed to said first and second block surfaces, respectively to provide a gas tight seal; and
said first and second electrodes positioned relative to each other to support a discharge current through said gas and establish a glow discharge region therebetween to induce a pair of counter-propagating laser beams to propagate through said glow discharge region in a direction transverse to the direction of said discharge current.

2. The ring laser of claim 1 wherein said first and second block surfaces are opposite planar surfaces of said block.

3. The ring laser of claim 1 wherein said first and second apertures are a single slot-shaped aperture through said block extending between said first and second block surfaces.

4. The ring laser of claim 1 wherein said glow discharge region is a region of a hollow cathode effect.

5. The ring laser of claim 1 wherein said third aperture is cylindrical thereby providing a cylindrical hollow cathode.

* * * * *